No. 800,847.  
PATENTED OCT. 3, 1905.

A. J. HERRICK.  
SEED PLANTER AND FERTILIZER DISTRIBUTER.  
APPLICATION FILED FEB. 17, 1905.

Witnesses  
E. F. Stewart  
Wm. Ragger

Andrew J. Herrick,  
Inventor by C. A. Snow & Co.  
Attorneys

UNITED STATES PATENT OFFICE.

ANDREW J. HERRICK, OF SAREPTA, LOUISIANA.

SEED-PLANTER AND FERTILIZER-DISTRIBUTER.

No. 800,847.          Specification of Letters Patent.          Patented Oct. 3, 1905.

Application filed February 17, 1905. Serial No. 246,187.

*To all whom it may concern:*

Be it known that I, ANDREW J. HERRICK, a citizen of the United States, residing at Sarepta, in the parish of Webster and State of Louisiana, have invented a new and useful Seed-Planter and Fertilizer-Distributer, of which the following is a specification.

This invention relates to seed-planters and fertilizer-distributers; and it has for its object to simplify and improve the construction and operation of this class of devices.

The present invention relates particularly to a seed-planter and fertilizer-distributer adapted to be operated or propelled by hand after the manner of a wheelbarrow, said device being provided with a barrow-frame having a transporting-wheel at one end and handles at the opposite end.

The invention consists in part in an improved construction and arrangement of parts whereby the planting mechanism may be detached from the barrow-frame and the latter be used independently for the purposes for which a wheelbarrow is ordinarily employed.

The invention further consists in the improved construction and novel arrangement and combination of parts, which will be hereinafter fully described, and particularly pointed out in the claim.

In the accompanying drawings has been illustrated a simple and preferred form of embodiment of the invention, it being, however, understood that no limitation is necessarily made to the precise structural details therein exhibited, but that changes and modifications within the scope of the invention may be made when such changes and modifications do not depart from the spirit or sacrifice the advantages of the invention.

Figure 1:
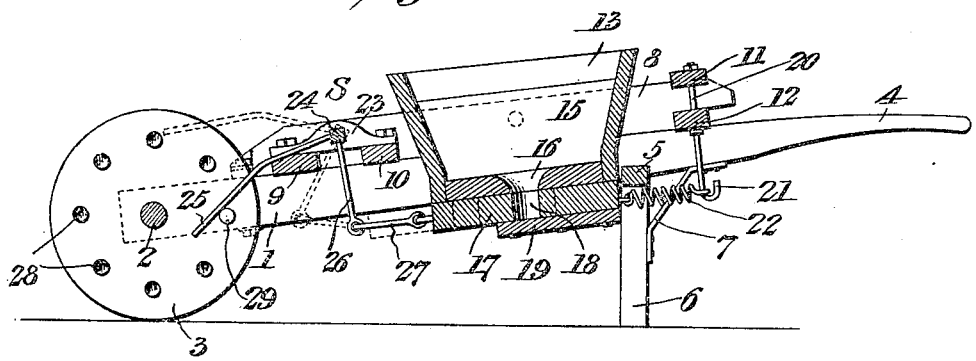
Figure 2:
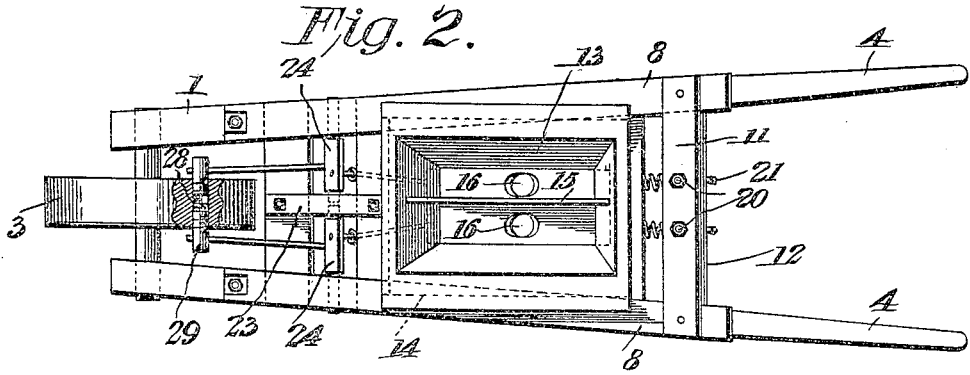
Figure 3:
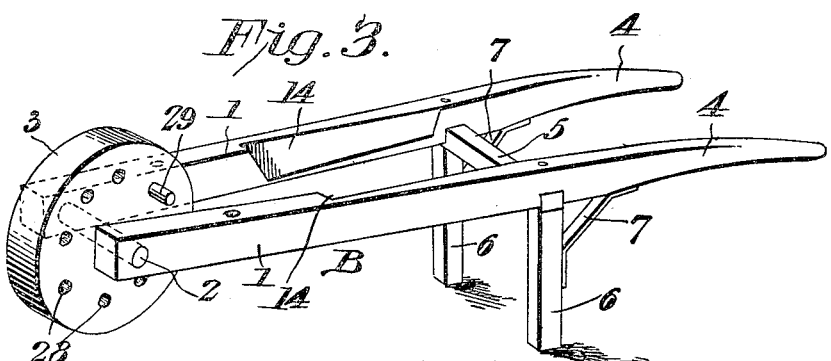

In said drawings, Figure 1 is a longitudinal sectional view of a seed-planter and fertilizer-distributer constructed in accordance with the principles of the invention. Fig. 2 is a top plan view of the same, and Fig. 3 is a perspective view showing the barrow-frame detached.

Corresponding parts in the several figures are indicated throughout by similar characters of reference.

B represents a barrow-frame, which is composed of side members 1 1, connected at one end by an axle 2, carrying a transporting-wheel 3. The opposite ends of the side members are extended to form handles 4 4, and said side members are also connected by a cross-piece 5 and provided with legs 6 6, the latter being preferably reinforced by braces 7.

Supported upon the barrow-frame is a seeder-frame S, which includes side pieces 8 8, connected near their front ends by cross-pieces 9 10 and near their rear ends by cross-pieces 11 12, the latter being disposed one above the other, as may be clearly seen in Fig. 1. The frame S serves to support a seed box or hopper 13, the sides of which converge downwardly, the lower ends of said sides being accommodated in recesses 14 in the inner sides of the side members 1 of the barrow-frame. The seedbox has in the present instance been shown as provided with a longitudinal division-plate 15, whereby it is divided into separate compartments, which may be used, respectively, for seed and for fertilizing material; but it is to be understood that within the scope of the invention the partition-plate may be dispensed with, in which event a single seed-slide will be substituted for the duplicate seed-slides to be presently described and other obvious modifications will be made. Each compartment of the hopper is provided with a perforation or passage 16, and beneath each compartment of the hopper is disposed a slide 17, having a perforation or cup 18, which is normally in alinement with the aperture 16. Suitable supporting and guiding means are provided for the slides 17, the same including a bottom member 19.

The transverse members 11 12 support rods 20, provided at their lower ends with hooks, as 21, which are connected by traction-springs 22 with the rear ends of the seed-slides, which latter are thereby maintained in normal position, as illustrated in Fig. 1.

The cross members 9 10 are connected by a longitudinally-disposed brace 23, which serves in conjunction with the side members 8 of the seeder-frame to afford bearings for a pair of rock-shafts 24, having forwardly-extending arms 25 and downwardly-extending arms 26, the latter being connected by means of links 27 with the front ends of the seed-slides.

The wheel 3 is provided with a plurality of transverse perforations 28 for the reception of tappets 29, the said perforations and tappets being preferably screw-threaded, as best seen in Fig. 2 of the drawings, for engagement with one another, thus enabling the position of the tappets to be readily changed and enabling a greater or a lesser number of said tappets to be used. Again, the tappets may be disposed on one side of the wheel only and entirely omitted from the other side, as in case it shall be desirable to operate one of the seed-slides only.

The seeder-frame with its related parts is preferably supported detachably upon the barrow-frame, with which it may be connected by means of bolts, clips, or other suitable well-known fastening devices.

The operation and advantages of this invention will be readily understood from the foregoing description, taken in connection with the drawings hereto annexed. When the device is propelled over the field, the tappets, which have been previously properly adjusted upon the wheel, will engage the arms 25, extending from the rock-shafts 24, thus causing the latter to oscillate in their bearings, and thus drawing the seed-slides in a forward direction against the tension of the springs 22, thereby causing the contents of the apertures 18 in the slide constituting the cups to be dropped, the seed-slides being instantly restored to normal position by the action of the springs 22. It is obvious that by properly disposing the tappets the seed-slides may be operated simultaneously or alternately, as may be preferred. It is also evident that when desired one of the seed-slides may be operated to the exclusion of the other one. Seed may be placed in one compartment and fertilizing material in the other, or seed or fertilizing material may be placed in both compartments, or the hopper may contain but a single compartment, as hereinbefore described, in which event it is obvious that only one seed-slide will be employed.

When the seeder-frame is detached from the barrow-frame, the latter, as shown in Fig. 3 of the drawings, may be used independently as an ordinary wheelbarrow. When thus used, a barrow-body may be suitably supported in the seats or recesses 14.

Having thus described the invention, what is claimed is—

In a device of the class described, a barrow-frame, a seeder-frame supported upon said barrow-frame and including side pieces and cross-pieces connecting said side pieces near their front and rear ends, a brace supported upon the front cross-pieces, rock-shafts journaled in said brace and in the adjacent side members of the seeder-frame and having downwardly-extending arms, seed-slides supported beneath the bottom of the hopper, links connecting said slides with the downward-extending arms of the rock-shafts, hook-rods supported by the cross-pieces in rear of the hopper, springs connecting said rods with the seed-slides, a supporting-wheel having tappets, and arms extending from the rock-shafts for engagement with said tappets.

In testimony that I claim the foregoing as my own I have hereto affixed my signature in the presence of two witnesses.

ANDREW J. HERRICK.

Witnesses:
  C. R. DAVIS,
  O. P. CLEMENT.